No. 741,376. Patented October 13, 1903.

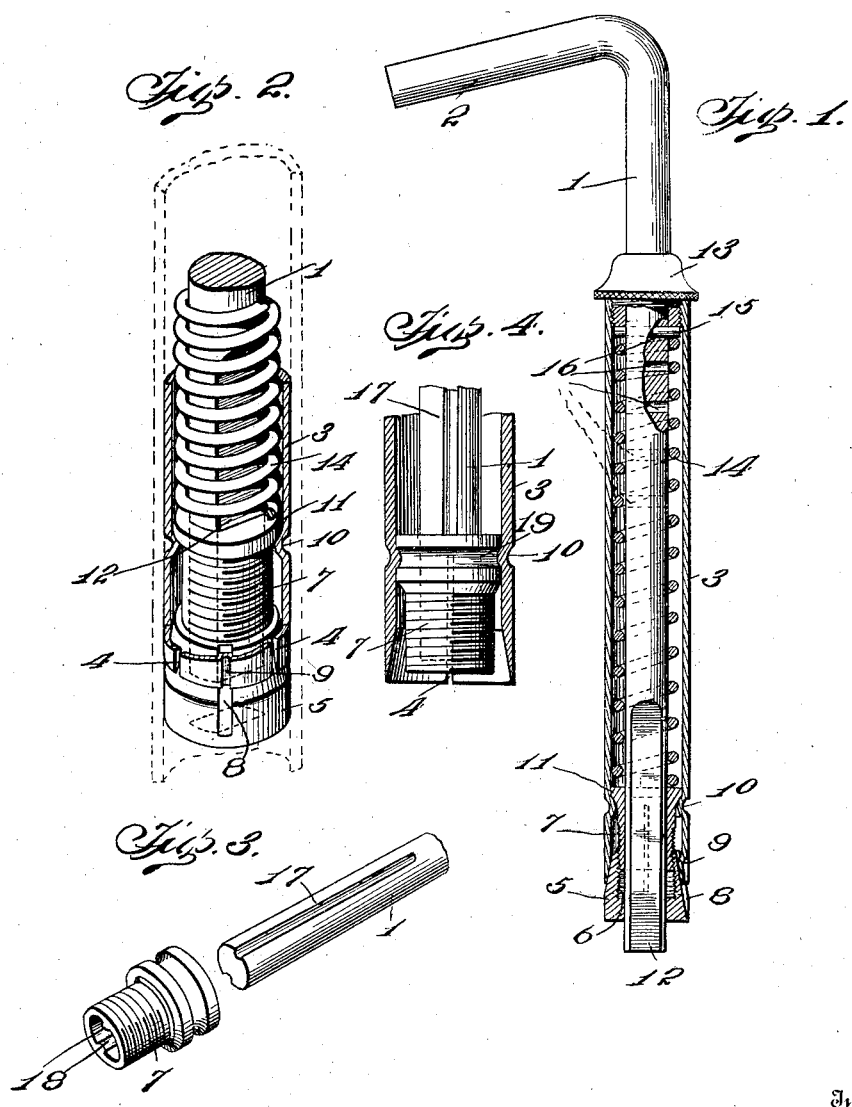

UNITED STATES PATENT OFFICE.

ADOLPH RYDQUIST, OF ROCHESTER, NEW YORK.

SEAT-POST.

SPECIFICATION forming part of Letters Patent No. 741,376, dated October 13, 1903.

Application filed April 8, 1903. Serial No. 151,669. (No model.)

*To all whom it may concern:*

Be it known that I, ADOLPH RYDQUIST, a citizen of the United States, residing at Rochester, in the county of Monroe and State of New York, have invented certain new and useful Improvements in Seat-Posts; and I do hereby declare the following to be a full, clear, and exact description of the invention, such as will enable others skilled in the art to which it appertains to make and use the same.

This invention relates to improvements in posts for bicycles, and is particularly adapted to spring seat-posts, although it is equally well adapted for spring-posts for handle-bars where the said handle-bars are attached to a forward extension of said post at its upper end.

It consists in a post for bicycles formed of a tube having a split end for expansion, an expander mounted in said tube, a nut for operating the same, and a post proper adapted to engage said nut and tighten it, the post, with its bent upper end, acting as a wrench.

It also consists in certain other novel constructions, combinations, and arrangements of parts, as will be hereinafter fully described and claimed.

In the accompanying drawings, Figure 1 is a view, partially in elevation and partially in section, of my improved bicycle-post. Fig. 2 is an enlarged detail view in perspective illustrating the construction of the device at the expander end thereof. Fig. 3 is a detail view showing the L-bar formed with grooves in its sides and showing a similarly-shaped aperture in the nut of the expander. Fig. 4 is a detail sectional view through the tube of the post, an expander-nut being shown in side elevation therein and provided with a groove for engaging an internal rib in the said tube.

I will describe my invention as applied to the seat-post of a bicycle, a practical embodiment of the same being illustrated in the drawings, in which the post proper, 1, is provided with a saddle-supporting end 2, turned at an angle with respect to the shank of the post, the said shank extending into the post tube or sleeve 3. The sleeve is split at its lower end at one or more places, as indicated at 4, so that it may be expanded by an internal expander for fastening it securely in the tubing of the bicycle-frame. The split expansion end of the tube 3 is preferably tapered upon its inner surface and is engaged by a tapered expander 5, which enters the lower end of the tube. The expander is internally screw-threaded at 6 and is engaged by a lock or expander nut 7. The expander is provided with a longitudinal groove 8 in its periphery, which is engaged by a depressed or ribbed portion 9 at the lower end of the tube 3. The rib 9 projects inwardly, so as not to enlarge the outer contour of the tube, and prevents the expander 8 from turning when in position in the end of the tube. A short distance above the lower end of the tube an internal annular rib 10 is formed, against which the head or shouldered portion 11 of the lock-nut 7 bears for enabling said nut to draw the expander into the end of the tube when the nut is turned. The groove 10 is easily formed in the tube by spinning the metal at this point.

The lower end of the seat-post proper, 1, is flattened upon opposite sides, as at 12, or otherwise formed with a many-sided contour, the apertures through the nut 7 and the expander 5 being made to fit the contour of the seat-post at this point, so that the post cannot be turned when extending into the said nut only without turning the nut, and the post cannot be turned at all when extending into the expander.

The outer end of the tube 3 is closed by a nut 13, the said nut loosely surrounding the post 1. The post 1 is supported upon a spring 14, which is inclosed by the tube 3, the lower end of said spring resting upon the expander-nut 11. The post 1 is provided with a pin or stud 15, which engages the upper end of the said spring, so that the weight of the post is supported by said spring. The pin 15 will also be engaged by the nut 13 for preventing the post from being withdrawn from its position in the tube 3. The tension of the spring 3 may be varied by placing the pin 15 in any one of a number of apertures 16, formed in the post 1.

When the post is to be removed from its position in the tube of a bycicle or like vehicle, the nut 13 is unscrewed from the end of the take 3. The post 1 is then raised sufficiently to release its lower end from its engagement with the aperture in the expander 5. The post is thus rendered capable of rotation, and by grasping the upper end 2 of the post as a handle the post may be turned, and by means of it the nut 11 also may be rotated to permit the expander 6 to descend from its position in the end of the tube 3. The split end of the tube will thus be permitted to collapse and loosen its grip upon the inner surface of the bicycle-tube and the whole structure may be withdrawn from the tube. In inserting and clamping the post in position in the tube the operation is reversed. After placing the post at a suitable height the post proper, 1, is rotated with its lower end engaging only the nut 11 so that the said nut is actuated for drawing the expander 5 into the split nut of the tube 3. When the tube has been sufficiently expanded to tightly clamp it in position in the bicycle-frame, the post is permitted to drop into the aperture in the expander. This will prevent the post from turning in either direction and will not only lock the seat-post in its proper position relative to the frame of the bicycle, but will prevent the expander-nut 11 from turning or working loose. The nut 13 is then screwed into position at the top of the tube 3, which prevents the post 1 from being raised out of engagement with the expander, and all the parts are thus locked in place. The post, however, is capable of longitudinal movement, its weight depressing the spring 14 and its lower end being capable of movement longitudinally through the apertures in the nut 11 and the expander 5.

It will be observed that the post 1 when in the position shown in Fig. 1 is locked against turning by its engagement with the expander 5, which cannot turn because of the rib 9, which engages the groove 8. It will also be observed that the lock or expander nut 11 cannot turn or loosen because of its engagement with the post 1. It will also be seen that while the post 1 is capable of a downward movement against the action of the spring 14 for forming a yielding support for a saddle yet the upward movement of the post is limited by the nut 13. It will be further seen that as soon as the nut 13 is removed the post 1 can be raised sufficiently to act in its capacity as a wrench upon the lock-nut 11 for turning it and releasing the expander or drawing it into position again, as required. The structure is simple and yet very effective for the desired purpose.

As above intimated, the lower end of the L-post may be formed of various shapes in cross-section, and in Fig. 3 I have illustrated a very good shape for the purpose. In this view it will be seen that the L-post is formed with longitudinal grooves 17, which engage internal ribs 18, formed in the aperture in the expander-nut and corresponding grooves formed in the expander. This form is desirable, as it is comparatively easy to form the grooves in the post and the ribs on the nut and expander. Of course it will be understood that I do not limit myself to two ribs or to two faces, as above described, since one rib or one flat face would be effective for the purpose desired, and a greater number may be employed without departing from the spirit of the invention. A variety of other configurations may be used also within the scope of the invention.

As shown in Fig. 4, the expander-nut may be formed with a larger head than that shown in Figs. 1 and 2 and may be provided with an annular groove 19 for engaging the internal rib in the post 2. In using this form of nut the rib in the top is spun into the groove of the nut, the nut being first put into proper position in the end of the tube.

While I have described my invention particularly as relating to the seat-post of a vehicle, it will be evident that it might be employed in other positions or places—as, for instance, for the handle-bar post of a bicycle. This is especially so when the post is provided with a forward extension at its upper end for holding the handle-bar forward of the post, as is quite commonly done, all within the scope and spirit of the invention.

Having thus fully described my invention, what I claim as new, and desire to secure by Letters Patent, is—

1. A post for vehicles comprising a tube formed with an expansible end portion, an expander mounted therein, a nut for operating the same and a post proper engaging the said nut for turning it and capable of engagement with the expander for preventing the post from turning after the nut has been adjusted, substantially as described.

2. An adjustable post for vehicles comprising a tube having split expansible portions at one end, an expander engaging said split end having an aperture formed therein, an apertured nut within the tube and a post engaging the aperture in the nut for turning the same, the post acting as a wrench when rotating the nut, the said post also engaging the aperture in the expander after adjusting the nut for locking the said nut after such adjustment, substantially as described.

3. A post mechanism for vehicles comprising a tube having an expansible end portion, an expander mounted therein, a nut for controlling the expander, a post engaging the nut and the expander, the said post acting both as a wrench and as a locking means for the nut successively, substantially as described.

4. An adjustable post mechanism for bicycles comprising a tube split at one end and formed with an inwardly-projecting annular rib, an expander engaging the split portion, a nut for moving the expander, the said nut engaging the said annular rib, and a post for engaging the nut to rotate it and also to lock it, substantially as described.

5. A seat-post for bicycles comprising a tube formed with a split expansible end portion, an expander engaging the same and formed with a longitudinal peripheral groove, a rib upon the tube engaging said groove and preventing the turning of the expander but not its longitudinal movement, a nut within the tube engaging the expander for moving it longitudinally, and a seat-post engaging the nut for turning it and then engaging the expander for preventing the turning of the nut, substantially as described.

6. A seat-post mechanism for bicycles comprising an expansible tube, an expander mounted therein, a nut for adjusting the expander, a post proper engaging the nut and the expander and capable of longitudinal movement in each, an annular rib in the tube for limiting the movement of the nut and enabling the same to draw the expander into the tube, a nut for closing the end of the tube and preventing the withdrawal of the post for locking the parts in position, substantially as described.

7. An adjustable seat-post for vehicles comprising a tube having an expansible end, an expander engaging the same and formed with a many-sided aperture, a nut engaging the expander for moving it, the said nut being also formed with a many-sided aperture, a post formed so as to fit the apertures in the said nut and an expander for adjusting the nut, and means for preventing the post from being withdrawn from its engagement with the expander to lock said post in position and thereby lock the expander-nut, substantially as described.

8. A seat-post mechanism for bicycles comprising an expansible tube, an expander mounted therein, and a nut for adjusting the same, a post having longitudinal engagement with the said nut and expander, a projection carried by the post, a spring within the tube engaging said projection for yieldingly supporting the post, and a nut for closing the end of the tube and holding the post in position, substantially as described.

9. A seat-post comprising a tube, an expander in the end thereof, and an expander-nut for operating the same, the said nut and expander being each formed with a central bore having one or more projections therein, an L-shaped bar forming the seat-post proper and having its lower end formed with one or more grooves to engage the projections in the nut and expander so that the said L-bar will be capable of turning the nut or locking it in position, substantially as described.

10. A seat-post mechanism comprising a tube, an expander and an expander-nut mounted therein having central bores, ribs projecting into said bores, a seat-post proper having grooves formed in its lower end for engaging the ribs in said bores for turning the expander-nut or locking it in position, substantially as described.

11. In a seat-post mechanism, the combination with a tube, an expander mounted within the tube, an expander-nut for adjusting the same, the said nut having a peripherial groove upon its head and a rib spun into the said groove from the walls of the tube to hold the said nut revolubly in place and an L-post for turning the said nut, substantially as described.

In testimony whereof I hereunto affix my signature in presence of two witnesses.

ADOLPH RYDQUIST.

Witnesses:
O. H. WESTBURG,
A. B. BUCKLAND.